United States Patent
Mitsumori

(10) Patent No.: US 9,749,265 B2
(45) Date of Patent: Aug. 29, 2017

(54) TRANSMISSION DEVICE AND TRANSMISSION METHOD

(71) Applicant: FUJITSU LIMITED, Kawasaki-shi, Kanagawa (JP)

(72) Inventor: Yasuyuki Mitsumori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 366 days.

(21) Appl. No.: 14/612,720

(22) Filed: Feb. 3, 2015

(65) Prior Publication Data
US 2015/0263969 A1    Sep. 17, 2015

(30) Foreign Application Priority Data

Mar. 13, 2014 (JP) ................................ 2014-049836

(51) Int. Cl.
| | | |
|---|---|---|
| H04L 12/805 | (2013.01) | |
| H04L 12/819 | (2013.01) | |
| H04L 12/859 | (2013.01) | |
| H04L 12/26 | (2006.01) | |
| H04L 12/865 | (2013.01) | |
| H04L 12/861 | (2013.01) | |

(52) U.S. Cl.
CPC ................... *H04L 49/90* (2013.01)

(58) Field of Classification Search
CPC ....................................................... H04L 49/90
See application file for complete search history.

(56) References Cited

U.S. PATENT DOCUMENTS

| | | | | |
|---|---|---|---|---|
| 7,149,184 | B2 * | 12/2006 | Takada | ................ H04L 25/0262 370/230 |
| 2005/0232150 | A1 * | 10/2005 | Nishimura | ............ H04L 47/215 370/230 |
| 2006/0193256 | A1 * | 8/2006 | Burns | ................. H04L 12/5693 370/230 |
| 2009/0213734 | A1 * | 8/2009 | Hashinaga | .............. H04L 47/10 370/235 |
| 2011/0305151 | A1 | 12/2011 | Takahara | |

FOREIGN PATENT DOCUMENTS

| | | |
|---|---|---|
| JP | 2009-010449 | 1/2009 |
| JP | 2009-147569 | 7/2009 |
| JP | 2011-259329 | 12/2011 |
| WO | 2004-109995 | 12/2004 |

\* cited by examiner

*Primary Examiner* — Melvin Marcelo
(74) *Attorney, Agent, or Firm* — Fujitsu Patent Center

(57) ABSTRACT

A transmission device includes: a first counter; a counter control unit configured to increment the first counter at a specified rate; a frame buffer configured to store a received frame; and a buffer control unit configured to read a frame from the frame buffer when a value of the first counter is larger than a specified threshold and output the frame. When a length of an output frame read from the frame buffer by the buffer control unit is shorter than a specified reference frame length, the counter control unit decrements the first counter by a value indicating the reference frame length. When the length of the output frame is longer than or equal to the reference frame length, the counter control unit decrements the first counter by a value indicating the length of the output frame.

10 Claims, 13 Drawing Sheets

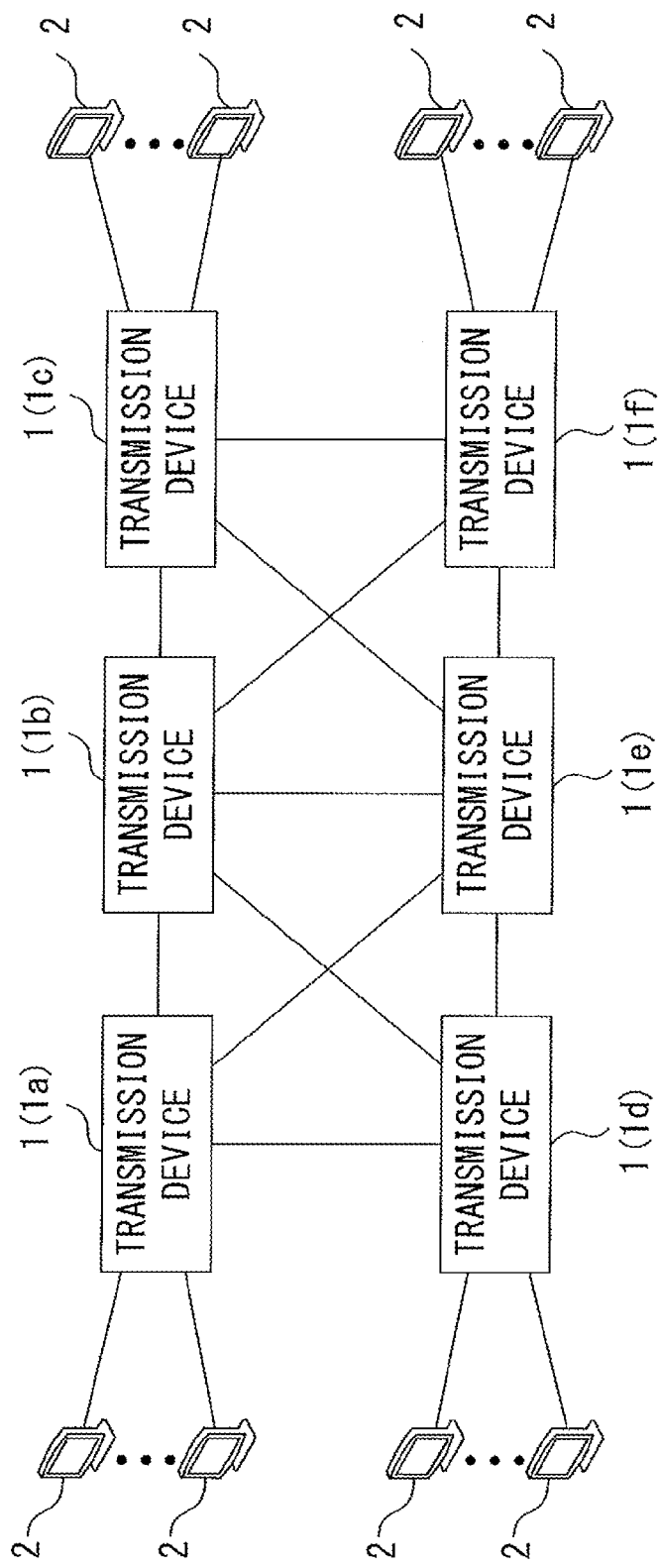
F I G. 1

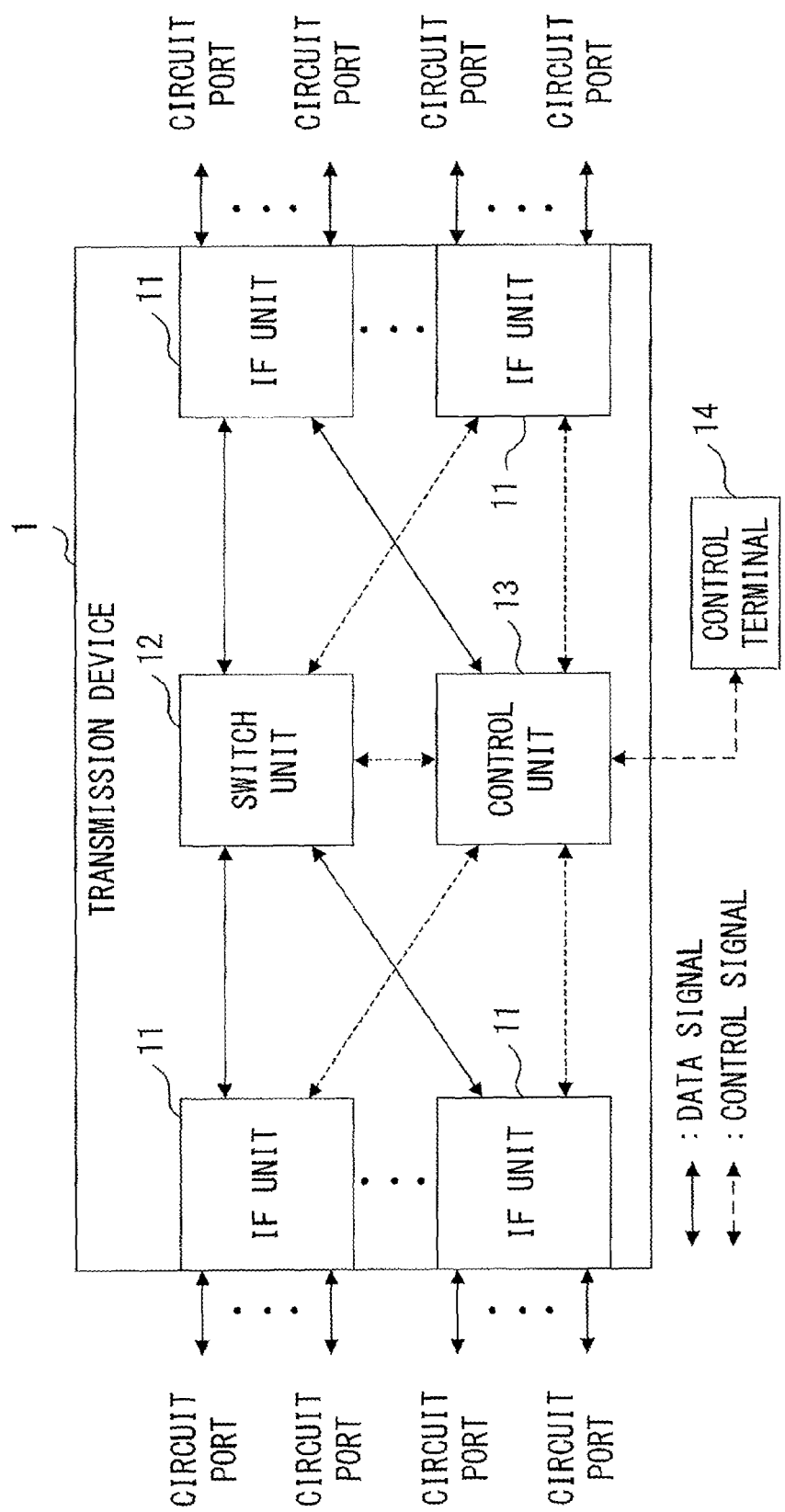
F I G. 2

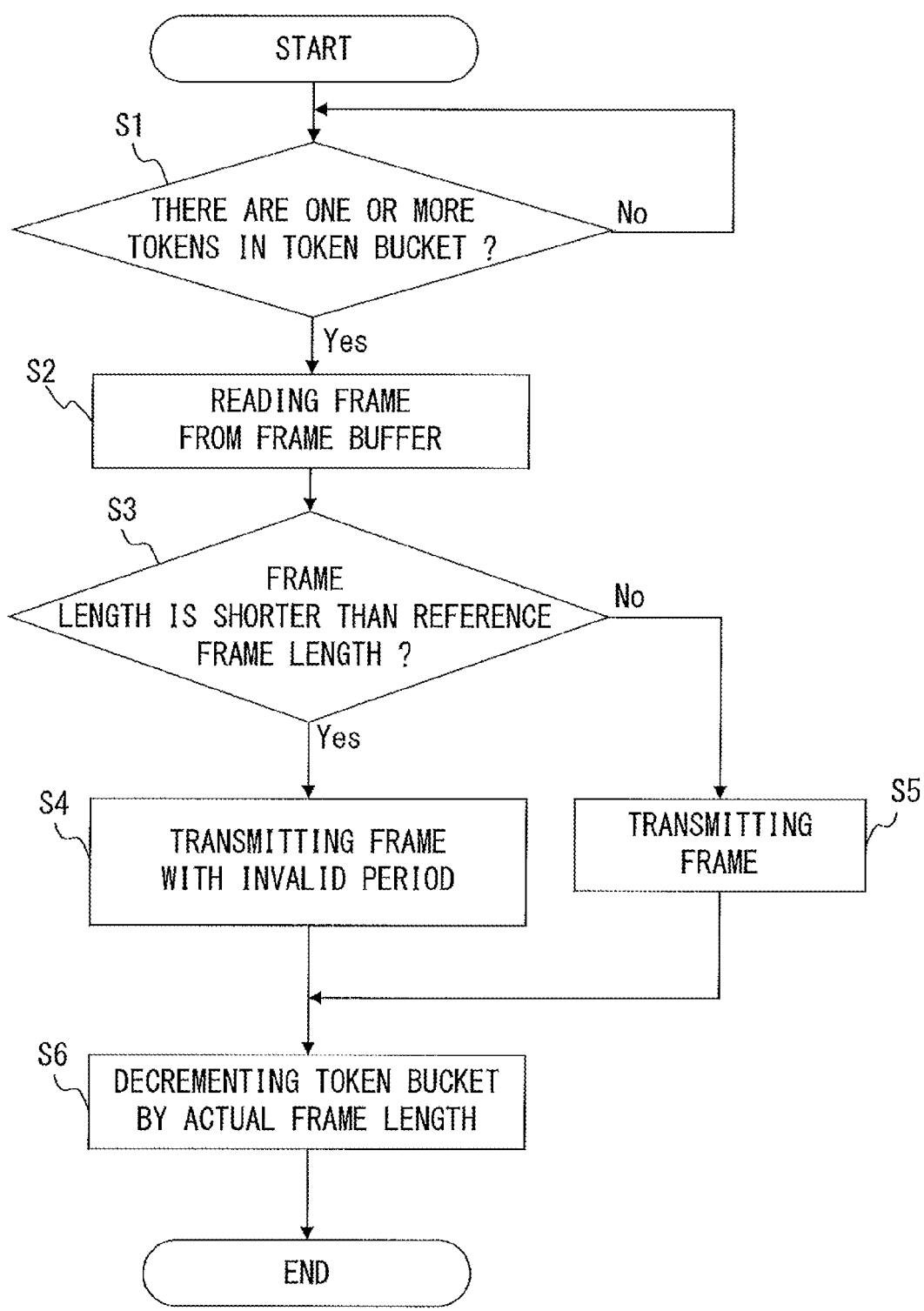
F I G. 5

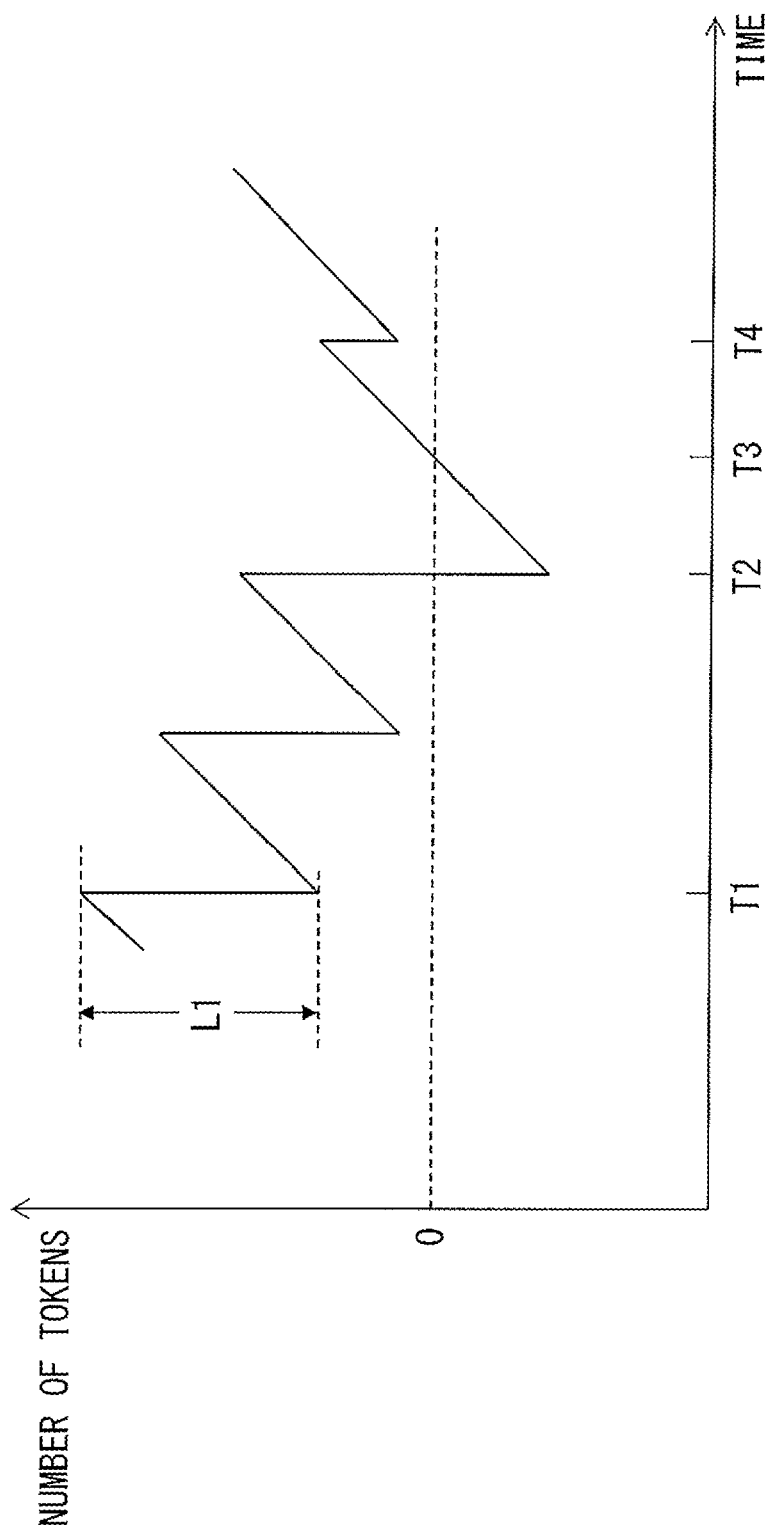
F I G. 6

TRANSMISSION DEVICE AND TRANSMISSION METHOD

CROSS-REFERENCE TO RELATED APPLICATION

This application is based upon and claims the benefit of priority of the prior Japanese Patent Application No. 2014-049836, filed on Mar. 13, 2014, the entire contents of which are incorporated herein by reference.

FIELD

The embodiments discussed herein are related to a device and a method for transmitting a frame or a packet.

BACKGROUND

With the spread of the Internet and a mobile communication, a carrier network provided by a common carrier is being transferred from a TDM network such as SONET/SDH (synchronous optical network/synchronous digital hierarchy) etc. to a packet network using an Ethernet (registered trademark) technique and an IP technique.

In the carrier network, a bandwidth guarantee has been put into practical use as one of the services provided for a user. In the bandwidth guarantee service, a maximum bandwidth (or a maximum transmission speed) determined based on, for example, a contract etc. is assigned to each user. In this case, a communication device which provides the bandwidth guarantee service performs bandwidth control so that the traffic of each user does not exceed a corresponding maximum bandwidth.

The bandwidth control is realized by, for example, data amount control. In this case, an amount of data per unit time is controlled. The amount of data may be expressed by bit/second (bps). The transmission device which relays a frame on a network (for example, a router) performs a routing process according to the address information included in the header of each frame. Therefore, when the number of frames per unit time increases, an overflow may occur in a circuit in the transmission device. Thus, the transmission device may control the number of frames. In the control of the number of frames, the number of transmission frames per unit time is limited not to exceed an allowed number.

The above-mentioned bandwidth control is realized using, for example, a token bucket. A token is provided at a specified rate for a token bucket. If the number of tokens accumulated in the token bucket exceeds a specified value (for example, zero), then a transmission control circuit reads a frame from a frame buffer and transmits the frame. In this case, the transmission control circuit reduces from the token bucket the number of tokens corresponding to the length of the frames read from the frame buffer. Therefore, the amount of data is controlled depending on the number of tokens supplied to the token bucket.

The related technique is described in, for example, WO2004/109995, Japanese Laid-open Patent Publication No. 2009-10449, Japanese Laid-open Patent Publication No. 2009-147569, and Japanese Laid-open Patent Publication No. 2011-259329.

In the bandwidth control using a token bucket, a burst transmission (the state in which the amount of data or the number of frames transitorily increases) may occur. Here, as described above, a token is supplied to the token bucket at a specified rate. Therefore, while a transmission device is not receiving a frame, tokens are accumulated in the token bucket. Afterwards, if the transmission device continuously receives frames (by the burst transmission), a transmission control circuit continuously outputs a frame until the number of tokens accumulated in the token bucket becomes is reduced to a specified value. Then, an overflow may occur in a frame processing circuit which processes the frames and/or a downstream node.

This problem may be solved by, for example, reducing the capacity of the token bucket (the number of tokens which may be accumulated in the token bucket). However, if the capacity of the token bucket is reduced too much, there is the possibility that the communication speed of a user does not reach the rate corresponding to a specified bandwidth.

SUMMARY

According to an aspect of the embodiments, a transmission device includes: a first counter; a counter control unit configured to increment the first counter at a specified rate; a frame buffer configured to store a received frame; and a buffer control unit configured to read a frame from the frame buffer when a value of the first counter is larger than a specified threshold and output the frame. When a length of an output frame read from the frame buffer by the buffer control unit is shorter than a specified reference frame length, the counter control unit decrements the first counter by a value indicating the reference frame length. When the length of the output frame is longer than or equal to the reference frame length, the counter control unit decrements the first counter by a value indicating the length of the output frame.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a network in which a transmission device according to embodiments of the present invention is used;

FIG. 2 illustrates an example of a configuration of the transmission device;

FIG. 5 is a flowchart of a bandwidth control method according to the first embodiment;

FIG. 6 illustrates an example of bandwidth control according to the first embodiment;

DESCRIPTION OF EMBODIMENTS

Figures 3A, 3B:
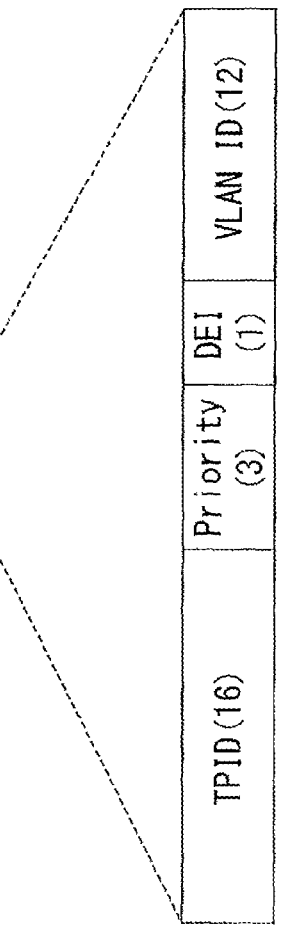
FIGS. 3A and 3B illustrate examples of a format of a frame transmitted by the transmission device.

FIG. 1 illustrates an example of a network in which a transmission device according to embodiments of the present invention is used. The network is configured by a plurality of transmission devices 1 (1a through 1f) as illustrated in FIG. 1. Each transmission device 1 is connected to one or more other transmission devices through, for example, an optical fiber. For example, the transmission device 1a is connected to the transmission devices 1b, 1d, and 1e, and the transmission device transmission device 1b is connected to the transmission devices 1a, 1c, 1d, 1e, and 1f. Furthermore, each transmission device 1 may accommodate one or more user terminals 2. In the example illustrated in FIG. 1, each of the transmission devices 1a, 1c, 1d, and 1f accommodates a plurality of user terminals 2.

The transmission device 1 forwards a frame received from the user terminal 2 or another transmission device 1 to a destination. That is, the transmission device 1 may forward a frame to the destination address of a received frame. For example, when an Ethernet frame or an IP frame is transmitted from the user terminal 2, the transmission device 1 forwards the frame according to the MAC address, the IP address, etc. stored in the received frame. In this specification, it is assumed that a frame and a packet are not discriminated from each other. Therefore, it is assumed that a "frame" includes a packet.

FIG. 2 illustrates a configuration of the transmission device 1. The transmission device 1 includes a plurality of IF (interface) units 11, a switch unit 12, and a control unit 13. In addition, a control terminal 14 is connected to the transmission device 1.

Each IF unit 11 is provided with a plurality of ports. In the present embodiment, the transmission device 1 is provided with a set of an input port and an output port for a correspondent device (another transmission device 1 or the user terminal 2). That is, the transmission device 1 receives a frame transmitted from a correspondent device through the input port, and transmits a frame to a correspondent device through the output port.

The IF unit 11 terminates a frame received through an input port, and guides the frame to the switch unit 12. Furthermore, the IF unit 11 outputs a frame guided from the switch unit 12 to the destination of the packet through a corresponding output port. The IF unit 11 is implemented by, for example, a pluggable module, board, or card.

The switch unit 12 is connected to a plurality of IF units 11. The switch unit 12 guides a frame input from one IF unit 11 to another IF unit 11 corresponding to the destination. The switch unit 12 includes a processor for controlling frame forwarding, memory, and a hardware circuit. Furthermore, the switch unit 12 is implemented by, for example, a pluggable module, board, or card.

The control unit 13 includes a CPU and memory, and controls the operations of the IF unit 11 and the switch unit 12. The control unit 13 may collect alarm information and/or statistical information. The control unit 13 is implemented by, for example, a pluggable module, board, or card.

The control terminal 14 is a computer connected to the control unit 13, and gives an instruction of a user or a network administrator to the transmission device 1. The control terminal 14 may be a part of the transmission device 1.

It is not necessary that each of the IF unit 11, the switch unit 12, and the control unit 13 is pluggable, but may be configured on a mother board. The transmission device 1 may further include other elements in addition to the IF unit 11, the switch unit 12, and the control unit 13.

FIGS. 3A and 3B illustrate examples of a format of a frame transmitted by the transmission device 1. In this example, the transmission device 1 transmits an Ethernet frame.

The numbers enclosed by the parentheses express the number of bits.

As illustrated in FIG. 3A, an Ethernet frame includes a destination MAC address (MAC DA), a source MAC address (MAC SA), an Ethernet type (E-TYPE), a protocol data unit (PDU), and a frame check sequence (FCS). The Ethernet type identifies the type of a message stored in the protocol data unit. As an example, 0x0800 expresses an IPv4 frame. The Ethernet type is regulated by, for example, IRNA. A protocol data unit stores a message of a higher layer. For example, user data is stored in the protocol data unit. The frame check sequence is used for frame error detection, and is realized by, for example, a CRC32 code.

FIG. 3B illustrates a format of an Ethernet frame to which a VLAN tag is assigned. A VLAN tag includes a tag protocol identifier (TPID), a priority, a DEI (drop eligible indicator), and a virtual LAN identifier (VLAN ID). A value indicating a virtual LAN identifier is stored in the frame is set in the tag protocol identifier. For example, 0x8100 regulated by IEEE802.1Q is set as the tag protocol identifier. The priority indicates the priority of a frame. In the example illustrated in FIG. 3B, the priority is defined by three bits, and can indicate eight classes. When the network is congested, the frame in which DEI=1 is set is discarded preferentially. The virtual LAN identifier may identify a user. A combination of a tag protocol identifier and a virtual LAN identifier may be referred to as a VLAN tag.

Described next is a bandwidth control function (or bandwidth management function) provided by the transmission device 1.

The transmission device 1 includes a bandwidth control device. The bandwidth control device controls, for example, the traffic of each user so that the maximum bandwidth assigned to each user is not exceeded. The bandwidth control device is provided in, for example, the IF unit 11 illustrated in FIG. 2. In this case, the bandwidth control device processes a frame received through an input port. Alternatively, the bandwidth control device may process a frame guided from the switch unit 12. The bandwidth control device may be provided in the switch unit 12. In this case, the bandwidth control device processes a frame guided from the IF unit 11.

First Embodiment

Figure 4:
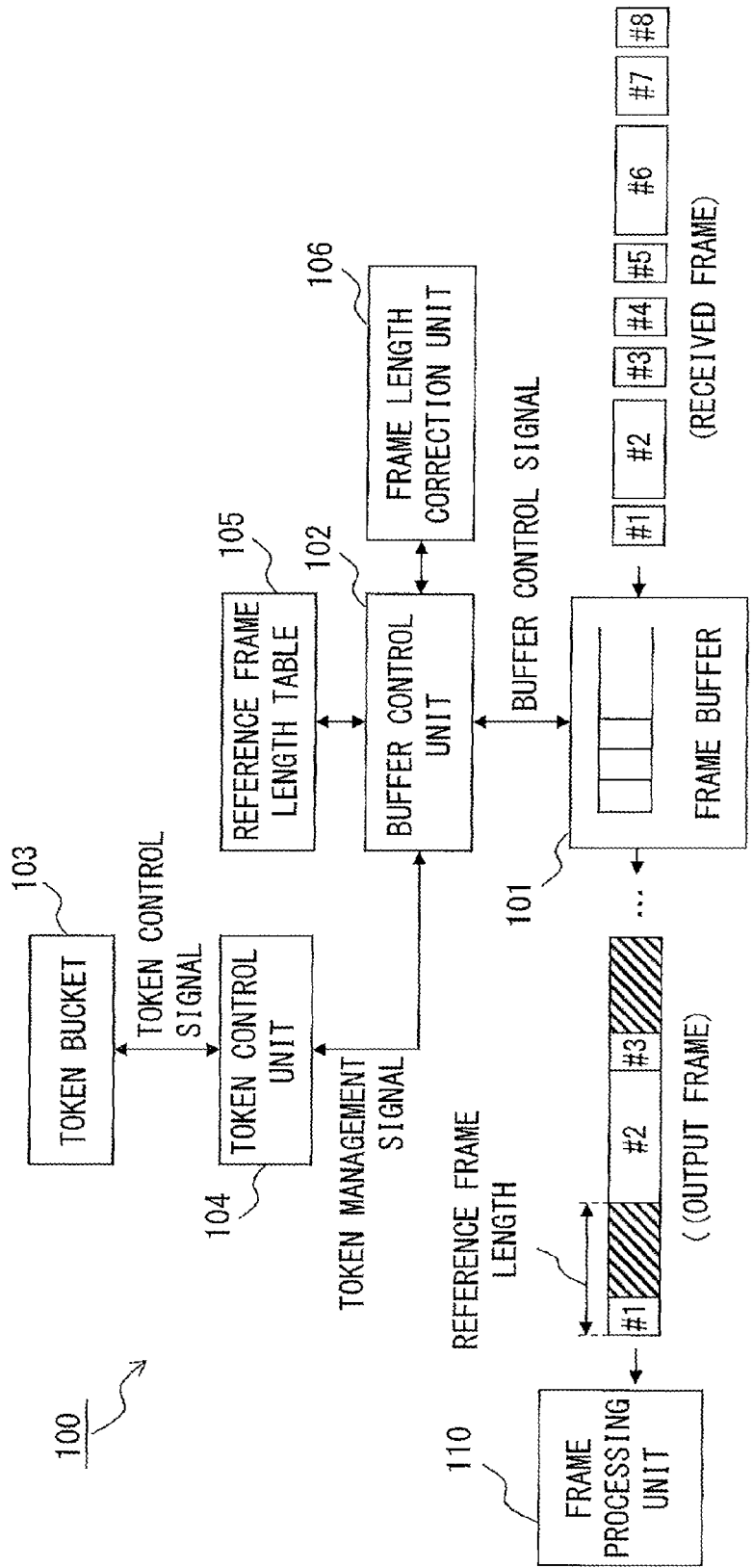
FIG. 4 illustrates a configuration of a bandwidth control device according to a first embodiment.

FIG. 4 illustrates a configuration of a bandwidth control device according to the first embodiment of the present invention. As illustrated in FIG. 4, a bandwidth control device 100 according to the first embodiment includes a frame buffer 101, a buffer control unit 102, a token bucket 103, a token control unit 104, a reference frame length table 105, and a frame length correction unit 106. The bandwidth control device 100 may include other elements not illustrated in FIG. 4.

The frame buffer 101 stores a received frame. The frame buffer 101 may store, for example, a received frame for each user. The user of each frame is identified by, for example, a "virtual LAN identifier (VLAN ID)" illustrated in FIG. 3B. The frame buffer 101 is implemented by, for example, a memory device.

The buffer control unit 102 may read and output a frame from the frame buffer 101. When the buffer output bandwidth (read bandwidth) is smaller than the buffer input bandwidth (write bandwidth), an overflow may occur in the frame buffer 101. In this case, for example, if the buffer control unit 102 has a function of a priority control, a low priority frame is discarded. The priority of each frame is identified by, for example, the "priority" illustrated in FIG. 3B.

The buffer control unit 102 reads a frame from the frame buffer 101 based on the number of tokens accumulated in the token bucket 103. In this case, the buffer control unit 102 may control the interval at which a frame is read from the frame buffer 101 based on the reference frame length registered in the reference frame length table 105.

The token bucket 103 stores or accumulates tokens. However, in the present embodiment, the token bucket 103 counts the number of tokens. Therefore, in the following descriptions, the number of tokens stored or accumulated in the token bucket 103 may be referred to as the "value of the token bucket 103". For example, when 100 tokens are supplied to the token bucket 103, the value of the token bucket 103 is incremented by 100. Therefore, in the present embodiment, the token bucket 103 may be implemented by a counter. It is assumed that the value of the token bucket 103 can be a negative value.

The token control unit 104 controls the number of tokens stored or accumulated in the token bucket 103. Practically, the token control unit 104 supplies a token to the token bucket 103 at a specified rate. The rate at which a token is supplied to the token bucket 103 (hereafter referred to as a token supply rate) regulates an allowable data rate (or a maximum bandwidth). For example, when the allowable data rate is 100 Mbps, the token control unit 104 supplies 100,000,000 tokens per second to the token bucket 103. In this case, the token bucket 103 counts the number of tokens at the rate of 100,000,000 per second. The token supply rate is specified by, for example, a network administrator. The token control unit 104 removes a token from the token bucket 103 at an instruction from the buffer control unit 102. For example, when the token control unit 104 removes 100 tokens from the token bucket 103, the value of the token bucket 103 is decremented by 100. Furthermore, the token control unit 104 may notifies the buffer control unit 102 of the state (for example, the number of tokens stored or accumulated in the token bucket 103) of the token bucket 103.

A reference frame length is registered in the reference frame length table 105. The reference frame length indicates the length of a frame. The length of a frame is expressed as the number of bits in this example. Furthermore, the reference frame length is specified based on, for example, an allowable data rate and the maximum number of transmission frames. As an example, the reference frame length is calculated by the following equation where the maximum number of transmission frames indicates the number of frames that may be transmitted per unit time.

reference frame length=allowable data rate [bps]/
maximum number of transmission frames [fps]

In this case, if an allowable data rate is specified, the maximum number of transmission frames is calculated by specifying the reference frame length. For example, the reference data length=10000 bits are given when the allowable data rate is 100 Mbps, then the maximum number of transmission frames=10,000 frames/second is obtained. That is, when an allowable data rate and a maximum number of transmission frames are given, a reference frame length is calculated.

The frame length correction unit 106 may correct the frame read from the frame buffer 101 at an instruction from the buffer control unit 102. That is, when the length of the output frame read from the frame buffer 101, the frame length correction unit 106 may correct the output frame so that the frame length is equal to the reference frame length. In this case, the frame length correction unit 106 may, for example, add dummy data to the end of the output frame.

Described next is the operation of the bandwidth control device 100. In the following descriptions, as illustrated in FIG. 4, it is assumed that received frames #1, #2, #3, . . . are sequentially input to the bandwidth control device 100. The received frames are sequentially stored in the frame buffer 101.

The token control unit 104 supplies tokens to the token bucket 103 at a specified rate as described above. Therefore, the token bucket 103 is continuously increased at the token supply rate.

The buffer control unit 102 periodically confirms the state of the token bucket 103 using a token management signal. The token management signal is received by the token control unit 104. The token control unit 104 detects the state of the token bucket 103, and notifies the buffer control unit 102 of the state. Practically, the number of tokens stored or accumulated in the token bucket 103 is notified to the buffer control unit 102. Alternatively, the buffer control unit 102 is notified as to whether or not the number of tokens stored or accumulated in the token bucket 103 is larger than a specified threshold. In this example, the threshold is, for example, zero.

When the number of tokens stored or accumulated in the token bucket 103 is larger than or equal to 1 (that is, there is any tokens in the token bucket 103), the buffer control unit 102 reads a frame stored at the head of the frame buffer 101. Thus, the value of the token bucket 103 indicates whether or not reading a frame from the frame buffer 101 is allowed. Hereafter, a frame read from the frame buffer 101 may be referred to as an "output frame".

The buffer control unit 102 notifies the token control unit 104 of the length of the frame read from the frame buffer 101 (that is, an output frame). In this case, the frame length is expressed as, for example, the number of bits. Then, the token control unit 104 decrements the token bucket 103 by the value indicated by the notified frame length. For example, when the frame length of an output frame is 128 bytes (that is, 1024 bits), the token bucket 103 is decremented by 1024. The value of the token bucket 103 can be a negative value.

As described, the value of the token bucket 103 is incremented at the token supply rate, and decremented depending on the length of each output frame. In this example, when the value of the token bucket 103 is larger than or equal to 1, the operation of reading a frame from the frame buffer 101 is permitted. Therefore, the output data rate is substantially restricted by the token supply rate. That is, the maximum output data rate is controlled using the token bucket 103.

The buffer control unit 102 compares the length of the output frame read from the frame buffer 101 with the reference frame length. When the length of the output frame is shorter than the reference frame length, the buffer control unit 102 provides an invalid period after the period allocated to the output frame in the time domain. In the invalid period, the process of reading the next frame from the frame buffer 101 is inhibited. The length of the invalid period corresponds to the difference between the length of the output frame and the reference frame length. For example, in the example illustrated in FIG. 4, the length of the frame #1 is shorter than the reference frame length. Therefore, the invalid period is provided at the end of the frame #1. In FIG. 4, the invalid period is indicated by a shaded region.

When the length of the output frame is shorter than the reference frame length, the buffer control unit 102 may correct the output frame in corporation with the frame length correction unit 106 so that the length of the output frame maybe equal to the reference frame length. In this case, for example, the frame length correction unit 106 adds dummy data to the end of the output frame. The data length of the dummy data corresponds to the difference between the reference frame length and the length of the output frame. Note that the invalid period may be realized by adding the dummy data to the end of the output frame.

On the other hand, when the length of the output frame is longer than or equal to the reference frame length, the buffer control unit 102 does not provide the invalid period after the output frame. Alternatively, no dummy data is added at the end of the output frame. For example, in the example in FIG. 4, the length of the frame #2 is longer than the reference frame length. Therefore, no invalid period is provided after the frame #2.

The output frame read from the frame buffer 101 is guided to a frame processing unit 110. The frame processing unit 110 processes the frame according to the information stored in the header of the frame. For example, the frame processing unit 110 filters the frame according to the header information. The frame processing unit 110 may determine the destination of the frame according to the header information. Furthermore, the frame processing unit 110 may process the data in the frame according to the header information.

As described, the bandwidth control device 100 according to the first embodiment controls the output data rate using the token bucket 103. In addition, when the length of the output frame is shorter than the reference frame length, the bandwidth control device 100 inserts the invalid period (or dummy data) corresponding to the difference between the length of the output frame and the reference frame length. Therefore, the interval at which a frame is read from the frame buffer 101 is controlled so that it is not shorter than the time corresponding to the reference frame length. That is, the upper limit of the number of transmission frames per unit time is appropriately restricted. As a result, the burst transfer of frames is suppressed.

For example, assume that frames having a short frame length (hereafter referred to as a short frame) have been continuously stored in the frame buffer 101. In this case, if buffer control is performed according to only the output data rate, there is the possibility that a number of short frames are continuously read from the frame buffer 101. However, in the bandwidth control device 100, the burst transfer of frames is suppressed by adding the invalid period (or dummy data) to a short frame. Therefore, the load of the frame processing per unit time in the frame processing unit 110 or the circuit in the destination node of the frame is suppressed.

The bandwidth control according to the first embodiment is also effective when the bandwidth is shared among a plurality of users. For example, it is assumed that the total bandwidth 1 Gbps is shared among users, and 100 Mbps is assigned to each user. In this case, the frame buffer 101 stores a received frame independently for each user. The bandwidth control device 100 includes the token bucket 103, the token control unit 104 and the reference frame length table 105 for each user. Then, the bandwidth control device 100 reads a frame from the frame buffer 101 so that the traffic of each user does not exceed 100 Mbps.

Assuming that the invalid period based on the reference frame length is not inserted, the number of transmission frames of a certain user may increase. For example, when one user continuously transmits a number of short frames, a data rate is restricted to a specified band, but the number of transmission frames of the user increases. Assuming that the performance of the frame processing unit 110 is not sufficiently high, the resources of the frame processing unit 110 are consumed by that user, thereby possibly affecting the traffic of other users.

On the other hand, in the bandwidth control device 100 according to the first embodiment, not only the data rate of each user is controlled, but also the number of transmission frames of each user is controlled. Therefore, although the bandwidth is shared among a plurality of users, the resources of the frame processing unit 110 are not excessively consumed by a part of users, and the traffic of all users is appropriately processed by the frame processing unit 110. When a plurality of users share the bandwidth, the reference frame length may be specified for each user.

FIG. 5 is a flowchart of a bandwidth control method according to the first embodiment. The process of the flowchart is performed periodically, for example. The token bucket 103 is incremented at a specified rate by the token control unit 104. The received frames are sequentially stored in the frame buffer 101.

In S1, the buffer control unit 102 decides whether one or more tokens are stored in the token bucket 103. When one or more tokens are stored in the token bucket 103 (that is, when the value of the token bucket 103 is one or more), the buffer control unit 102 reads a frame stored at the head of the frame buffer 101 in S2. On the other hand, when there is no token in the token bucket 103 (that is, when the value of the token bucket 103 is equal to or lower than zero), the buffer control unit 102 does not read a frame from the frame buffer 101.

In S3, the buffer control unit 102 compares the length of the output frame read from the frame buffer 101 with the reference frame length. When the length of the output frame is shorter than the reference frame length, the buffer control unit 102 adds an invalid period or dummy data to the end of the output frame and transmits the frame in S4. On the other hand, when the length of the output frame longer than or equal to the reference frame length, the buffer control unit 102 transmits the output frame without adding the invalid period or the dummy data in S5.

In S6, the buffer control unit 102 notifies the token control unit 104 of the length of the output frame. Then, the token control unit 104 decrements the token bucket 103 by the value indicating the length of the output frame. In the following descriptions, the length of the output frame read from the frame buffer 101 may be hereafter referred to as an "actual frame length". That is, in S6, the token bucket 103 is decremented by the value indicating the actual frame length of the output frame.

The buffer control unit 102 and the token control unit 104 are implemented by, for example, a hardware circuit which performs the process of the flowchart illustrated in FIG. 5. Alternatively, the buffer control unit 102 and the token control unit 104 may be implemented by the processor executing the program describing the process of the flowchart illustrated in FIG. 5. Furthermore, the buffer control unit 102 and the token control unit 104 may be implemented by a combination of a hardware circuit and software.

FIG. 6 illustrates an example of a bandwidth control according to the first embodiment. In the first embodiment, when a frame is read from the frame buffer 101, the token bucket 103 is decremented by the value indicating the length of the frame. In the example illustrated in FIG. 6, the frame of the frame length L1 is read at time T1. As a result, the token bucket 103 is decremented by the value corresponding to L1. When there is no token left in the token bucket 103 (that is, when the value of the token bucket 103 is zero or negative), the buffer control unit 102 is unable to read a frame from the frame buffer 101. In the example illustrated in FIG. 6, the buffer control unit 102 is unable to read a frame from the frame buffer 101 at the period T2-T3. Afterwards, at time T4, the next frame is read from the frame buffer 101.

Second Embodiment

The configuration of the bandwidth control device is substantially the same in the first and second embodiments. That is, the bandwidth control of the second embodiment is performed by the bandwidth control device 100 illustrated in FIG. 4. However, the method of controlling the token bucket 103 is different between the first and second embodiments.

Figure 7:
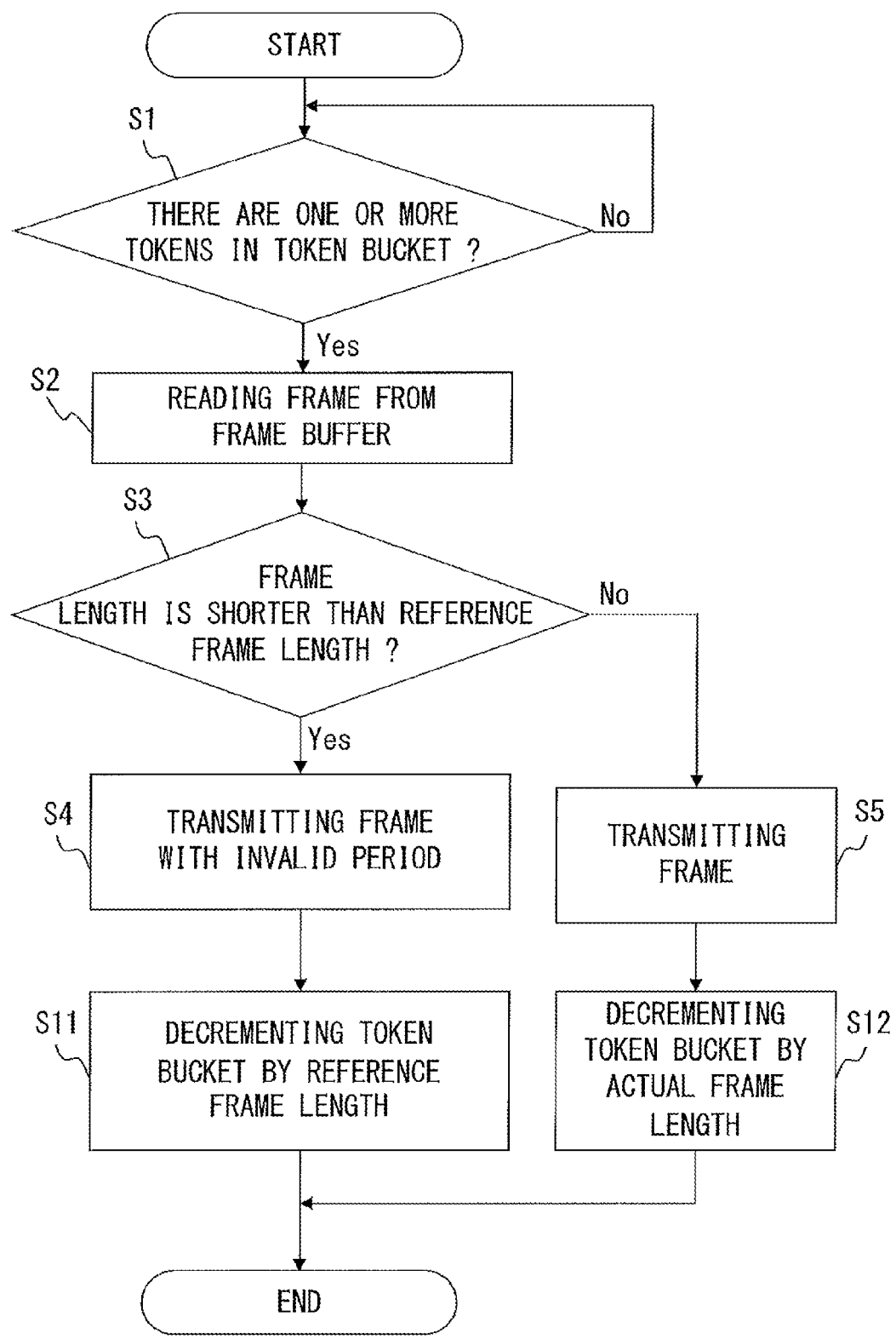
FIG. 7 is a flowchart of a bandwidth control method according to a second embodiment.

FIG. 7 is a flowchart of the bandwidth control method according to the second embodiment. Similar to the process in the first embodiment, the process of the flowchart is periodically performed, for example. Furthermore, as in the first embodiment, the token bucket 103 is incremented at a specified rate by the token control unit 104, and a received frames are sequentially stored in the frame buffer 101.

In the first embodiment, as illustrated in FIG. 5, the token bucket 103 is decremented by the value indicating the actual frame length regardless of the length of the output frame read from the frame buffer 101. On the other hand, as illustrated in FIG. 7, according to the second embodiment, when the length of the output frame read from the frame buffer 101 is shorter than the reference frame length, the token control unit 104 decrements the token bucket 103 by the value indicating the reference frame length in S11. When the length of the output frame read from the frame buffer 101 is longer than or equal to the reference frame length, the token control unit 104 decrements the token bucket 103 by the value indicating the actual frame length of the output frame in S12.

Figure 8:
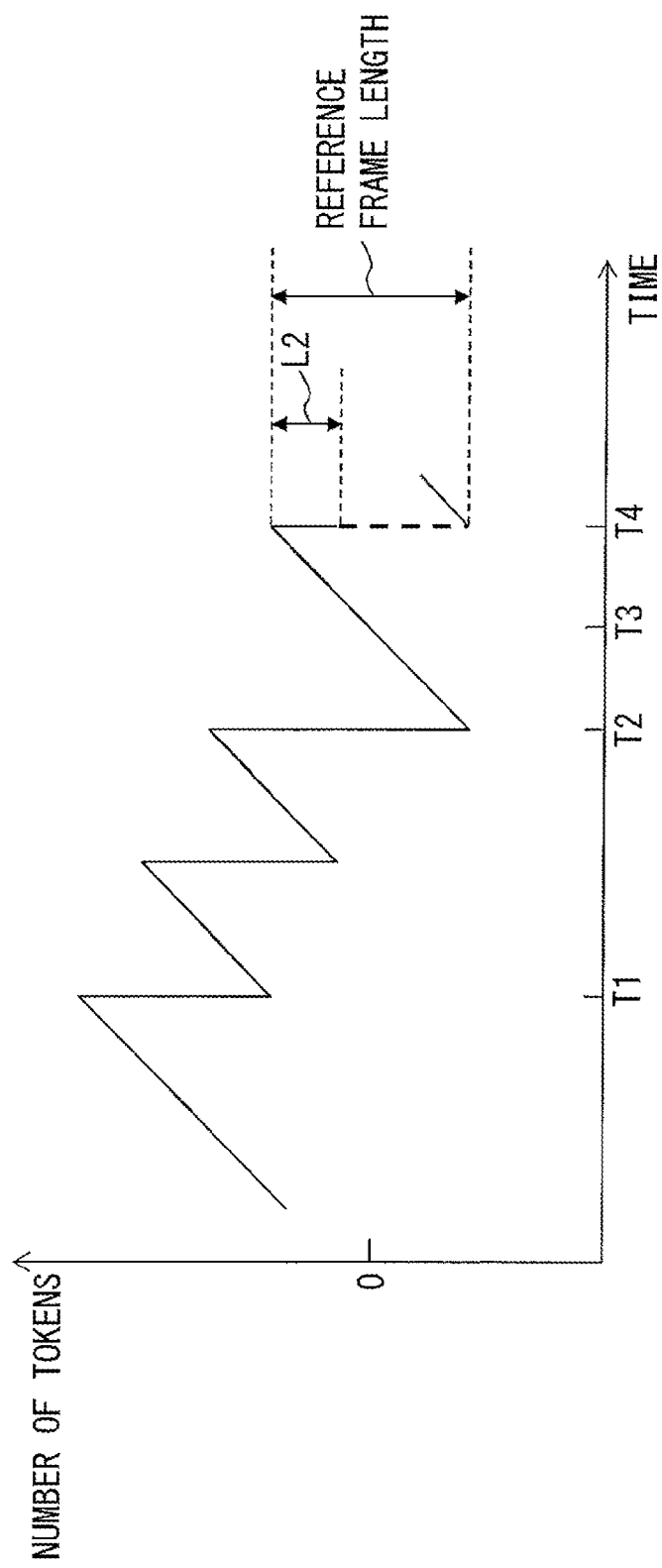
FIG. 8 illustrates an example of bandwidth control according to the second embodiment.

FIG. 8 illustrates an example of the bandwidth control according to the second embodiment. In FIGS. 6 and 8, the operation conditions (token supply rate, reference frame length, etc.) are the same.

The length L1 of the frame read from the frame buffer 101 at time T4 is shorter than the reference frame length. In this case, in the first embodiment, the token control unit 104 decrements the token bucket 103 by the value indicating the actual frame length as illustrated in FIG. 6. On the other hand, in the second embodiment, the token control unit 104 decrements the token bucket 103 by the value indicating the reference frame length as illustrated in FIG. 8.

As described, in the second embodiment, when the length of the output frame is shorter than the reference frame length, the token bucket 103 is decremented by the value indicating the reference frame length. That is, in the second embodiment, when an invalid period (or dummy data) is added to the end of the frame of a certain user, the bandwidth corresponding to the invalid period is allocated to the user in the bandwidth control. Therefore, as compared with the first embodiment, the value of the token bucket 103 tends to be smaller.

For example, in the first embodiment, the value of the token bucket 103 is not negative at time T4 as illustrated in FIG. 6. On the other hand, in the second embodiment, the value of the token bucket 103 at time T4 is negative as illustrated in FIG. 8. Note that in the period when the value of the token bucket 103 is negative, the buffer control unit 102 is unable to read a frame from the frame buffer 101. Therefore, in the second embodiment, the number of transmission frames per unit time maybe suppressed using the token bucket 103. Therefore, in the second embodiment, when the length of the output frame is shorter than the reference frame length, it is not necessarily to add an invalid period to the end of the output frame. In this case, it is not necessary that the bandwidth control device 100 includes the frame length correction unit 106.

Third Embodiment

Figure 9:
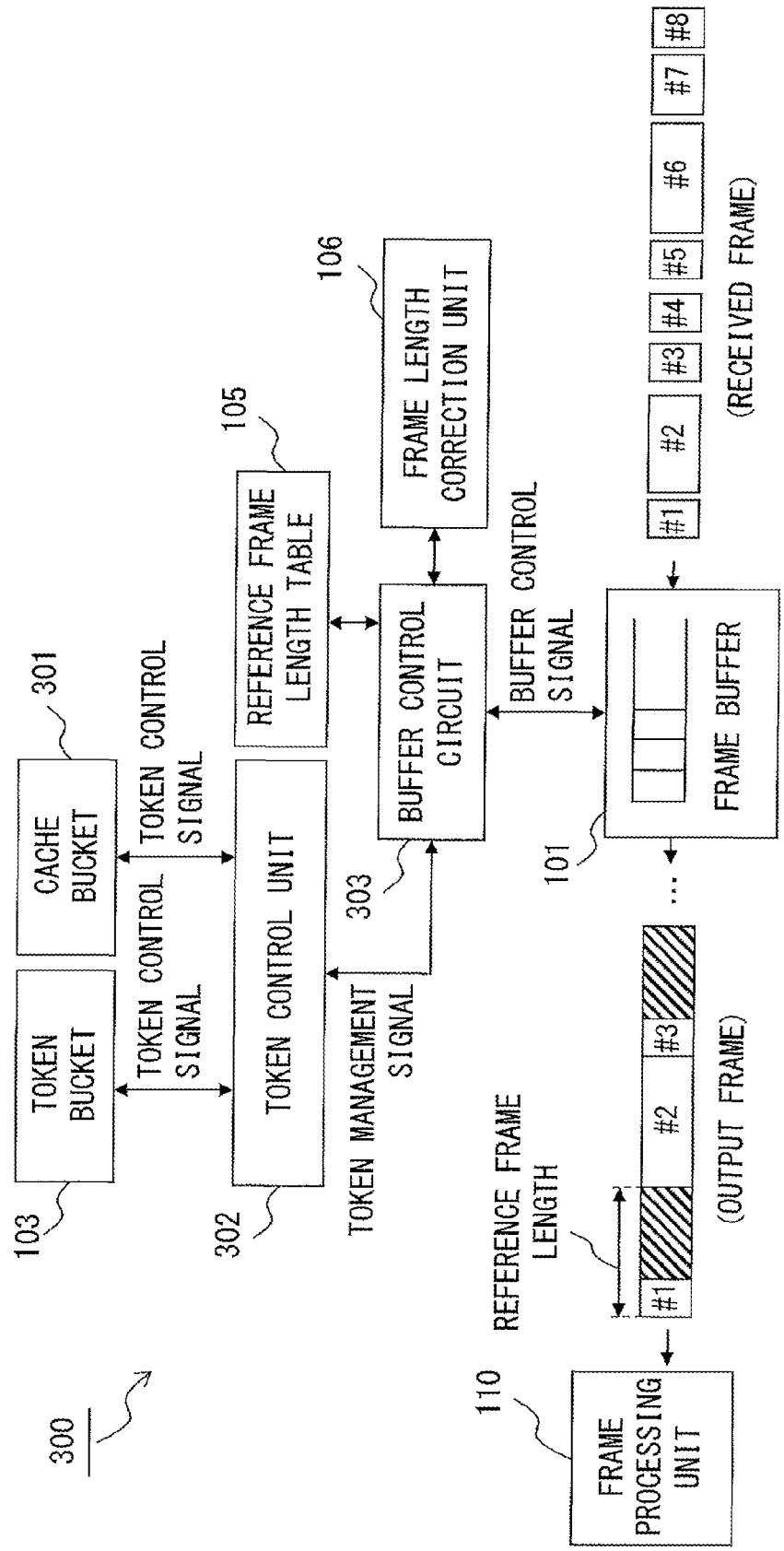
FIG. 9 illustrates a configuration of a bandwidth control device according to a third embodiment.

FIG. 9 illustrates a configuration of a bandwidth control device according to the third embodiment of the present invention. As illustrated in FIG. 9, a bandwidth control device 300 according to the third embodiment includes the frame buffer 101, the token bucket 103, the reference frame length table 105, the frame length correction unit 106, a cache bucket 301, a token control unit 302, and a buffer control unit 303. The frame buffer 101, the token bucket 103, the reference frame length table 105, and the frame length correction unit 106 are substantially the same in the first and third embodiments. The bandwidth control device 300 may include other elements not illustrated in FIG. 9.

The cache bucket 301 may temporarily store a token removed from the token bucket 103 under a specified condition. In the embodiment, like the token bucket 103, the cache bucket 301 counts the number of tokens. Therefore, in the following descriptions, the number of tokens stored in the cache bucket 301 may be referred to as a "value of the cache bucket 301". Furthermore, like the token bucket 103, the cache bucket 301 may be implemented by a counter. However, although tokens are supplied at a specified rate to the token bucket 103, tokens are not supplied at constant rate to the cache bucket 301.

The token control unit 302 controls the token bucket 103 in the same method as in the first or second embodiment. In addition, the token control unit 302 also controls the cache bucket 301. The buffer control unit 303 reads and outputs a frame from the frame buffer 101 according to not only the value of the 103 but also the value of the cache bucket 301. The operation of the bandwidth control device 300 according to the third embodiment is described below with reference to a flowchart.

Figure 10:
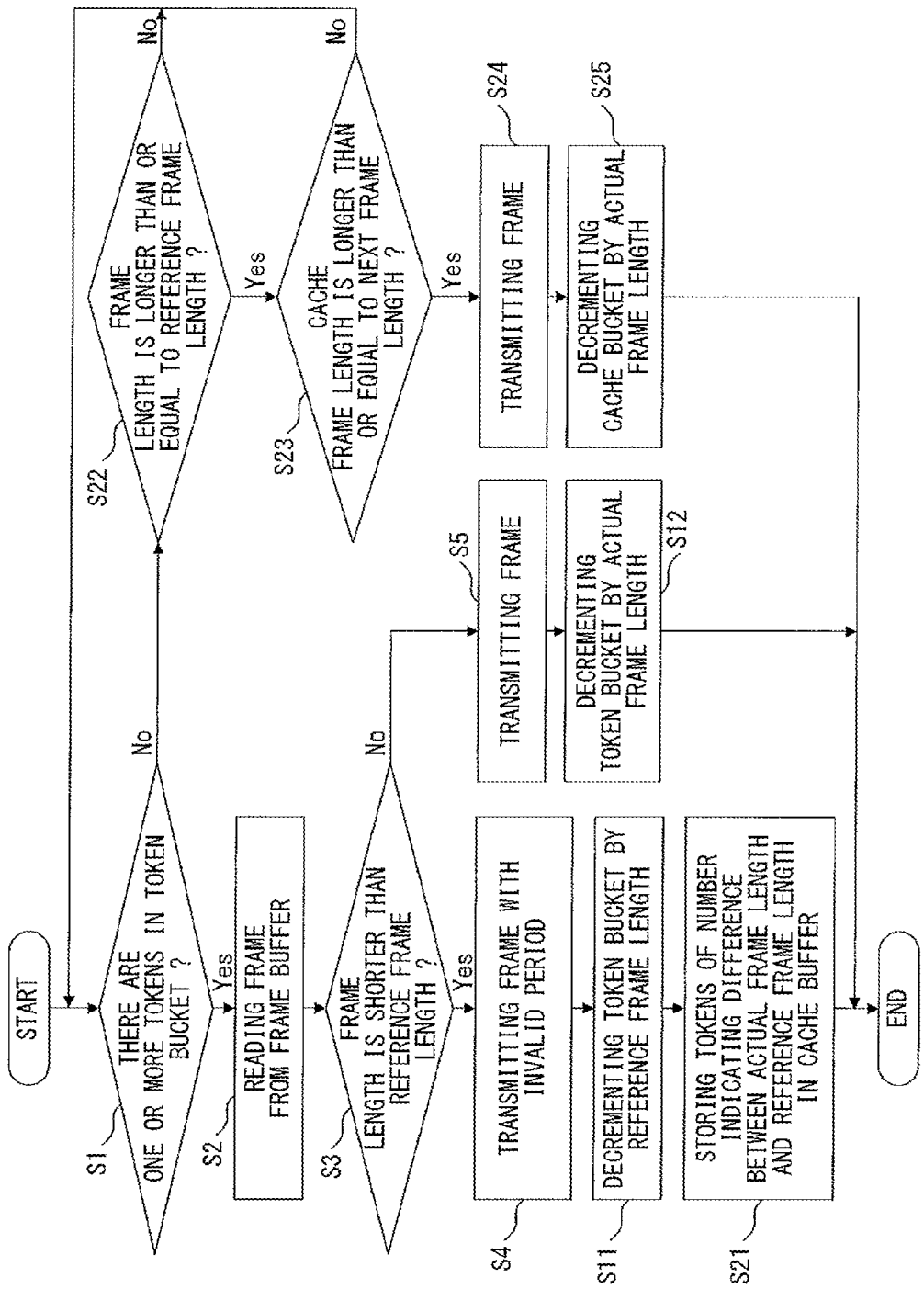
FIG. 10 is a flowchart of a bandwidth control method according to the third embodiment.

FIG. 10 is a flowchart of the bandwidth control method according to the third embodiment. The process of the flowchart is performed, for example, periodically as with the first embodiment. Furthermore, as with the first embodiment, the token bucket 103 is incremented by the token control unit 302 at a specified rate. Received frames are sequentially stored in the frame buffer 101.

The processes in S1-S5, S11, and S12 are substantially the same in the second and third embodiments. That is, also in the third embodiment, when the length of the output frame read from the frame buffer 101 is shorter than the reference frame length, the invalid period (or dummy data) is added to the end of the output frame, and the token bucket 103 is decremented by the value indicating the reference frame length. When the length of the output frame is longer than or equal to the reference frame length, the token bucket 103 is decremented by the value indicating the actual frame length without adding the invalid period (or dummy data) to the output frame.

However, in the third embodiment, when the length of the output frame is shorter than the reference frame length, the tokens of the number corresponding to the difference between the actual frame length and the reference frame length are stored in the cache bucket 301 in S21 after S11. That is, the cache bucket 301 is incremented by the value indicating the difference between the actual frame length and the reference frame length.

Furthermore, in the first and second embodiments, when there is no token left in the token bucket 103 (that is, when the value of the token bucket 103 is negative or zero), the buffer control unit 102 does not read a frame from the frame buffer 101. On the other hand, in the third embodiment, even when no token is left in the token bucket 103, if the conditions in S22 and S23 are satisfied, the buffer control unit 102 may read a frame from the frame buffer 101. Therefore, when no token is left in the token bucket 103 (NO in S1), the process of the bandwidth control device 300 is moved to S22.

In S22, the buffer control unit 303 decides whether the length of the frame stored at the head of the frame buffer 101 (hereafter referred to as a next frame length) is longer than or equal to the reference frame length. If the next frame length is longer than or equal to the reference frame length, the process of the buffer control unit 303 is moved to S23. On the other hand, if the next frame length is shorter than the reference frame length, the process of the buffer control unit 303 is returned to S1.

In S23, the buffer control unit 303 compares the frame length corresponding to the number of tokens left in the cache bucket 301 (hereafter referred to as a cache frame length) with the next frame length. If the cache frame length is longer than or equal to the next frame length, the process of the buffer control unit 303 is moved to S24. That is, if there are sufficient number of tokens left in the cache bucket 301 with respect to the length of the frame stored at the head of the frame buffer 101, then the processes in S24 and S25 are performed. If the cache frame length is shorter than the next frame length, then the process of the buffer control unit 303 is returned to S1. That is, if there are not sufficient number of tokens left in the cache bucket 301 with respect to the length of the frame stored at the head of the frame buffer 101, then the buffer control unit 303 does not read a frame from the frame buffer 101.

In S24, the buffer control unit 303 reads and outputs a frame stored at the head of the frame buffer 101. In this case, it is not necessary for the buffer control unit 303 to add the invalid period (or dummy data) at the end of the frame. Then, in S25, the token control unit 302 decrements the cache bucket 301 by the value indicating the actual frame length (that is, the length of the frame read from the frame buffer 101). The actual frame length in S25 is equal to the next frame length in S22 and S23.

As described, in the third embodiment, when the length of the output frame is shorter than the reference frame length, the token bucket 103 is decremented by the value indicating the reference frame length. That is, when the length of the output frame is shorter than the reference frame length, the token bucket 103 is decremented by the value indicating the reference frame length which is larger than the actual frame length. Then, in this case, the token control unit 302 increments the cache bucket 301 by the value indicating the different between the actual frame length and the reference frame length.

Although there is no token left in the token bucket 103, the buffer control unit 303 may read a frame from the frame buffer 101 under a specified condition. Practically, when the value of the token bucket 103 is negative or zero, if the following two conditions are satisfied, then the buffer control unit 303 reads a frame from the frame buffer 101.
(1) The length of the frame stored at the head of the frame buffer 101 (that is, the next frame length) is longer than or equal to the reference frame length.
(2) The length of the frame corresponding to the number of tokens left in the cache bucket 301 (that is, cache frame length) is longer than or equal to the next frame length.

The first and second embodiments are compared with the third embodiment. In the first embodiment, the token bucket 103 is decremented by the value indicating the actual frame length when the actual frame length is shorter than the reference frame length. In the second embodiment, when the actual frame length is shorter than the reference frame length, the token bucket 103 is decremented by the value indicating the reference frame length. That is, in the second embodiment, the token bucket 103 is decremented more as compared with the first embodiment.

In the third embodiment, the "difference" between the first embodiment and the second embodiment is stored in the cache bucket 301. That is, the cache bucket 301 is incremented by the value indicating the difference between the actual frame length and the reference frame length. Then, the token stored in the cache bucket 301 is used when the above-mentioned conditions (1) and (2) are satisfied. That is, the bandwidth control according to the third embodiment is considered between the first and second embodiments in the viewpoint of whether the invalid period is to be processed as a consumed bandwidth.

In the second embodiment, when the invalid period is provided for a short frame of a certain user, the invalid period is counted as an consumed bandwidth by the user. Therefore, in the second embodiment, there is the possibility that a sufficient transmission data rate is not obtained with respect to an allowed bandwidth for the traffic including short frames. On the other hand, according to the third embodiment, when the invalid period is provided for a short frame of a certain user, tokens corresponding to the invalid period are stored in the cache bucket 301. Then, the tokens stored in the cache bucket 301 are used for transmission of other frames of the user. That is, the bandwidth excessively counted when a short frame is transmitted is used in transmitting other frames. Therefore, according to the bandwidth control method of the third embodiment, the transmission data rate specified using the token bucket 103 can be guaranteed.

The buffer control unit 303 and the token control unit 302 are implemented by, for example, a hardware circuit which performs the process of the flowchart illustrated in FIG. 10. Alternatively, the buffer control unit 303 and the token control unit 302 may be implemented by a processor executing the program which describes the process of the flowchart illustrated in FIG. 10. Furthermore, the buffer control unit 303 and the token control unit 302 may be implemented by a combination of a hardware circuit and software.

Figure 11:
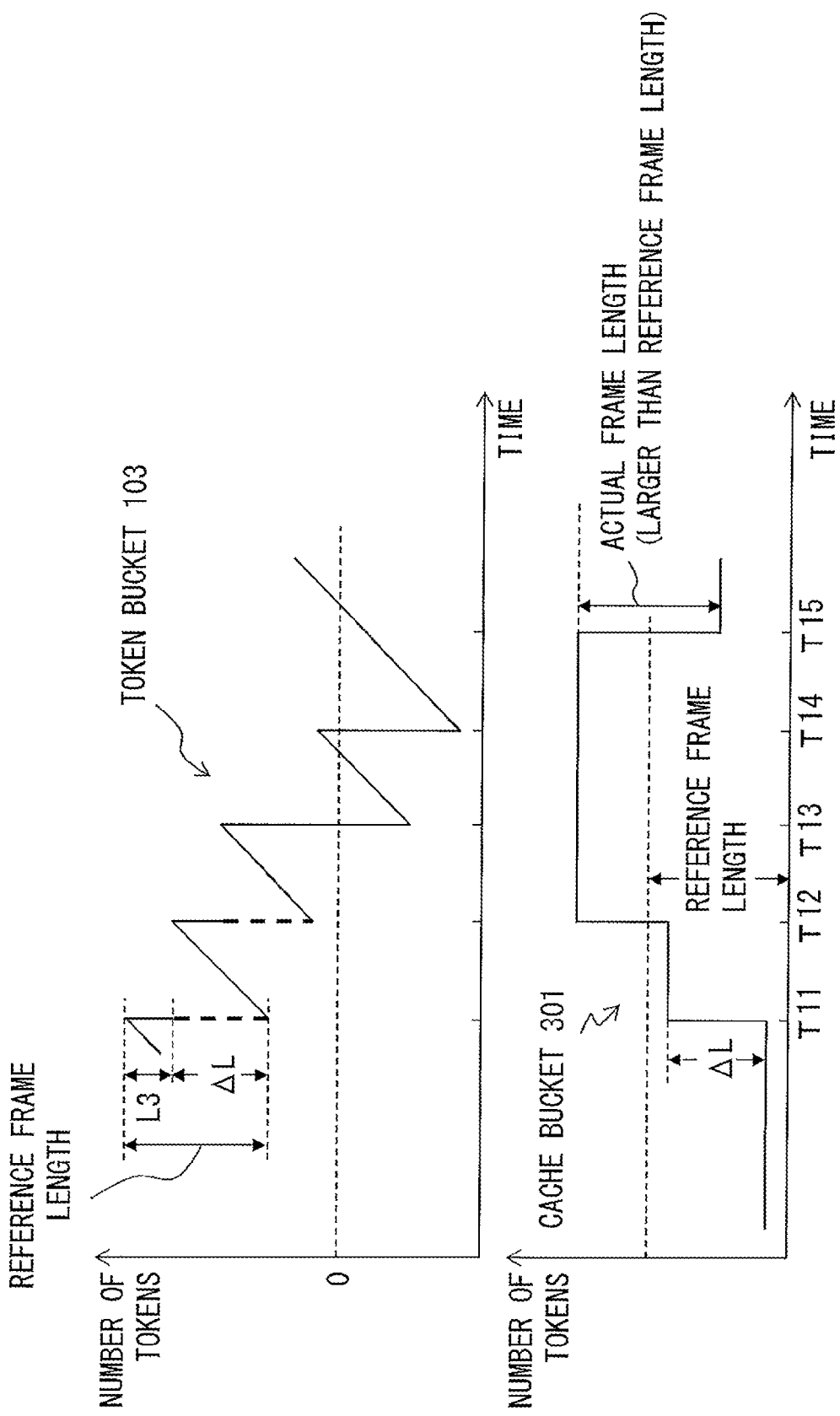
FIG. 11 illustrates an example of bandwidth control according to the third embodiment.

FIG. 11 illustrates an example of bandwidth control according to the third embodiment. In this example, the length L3 of the output frame read from the frame buffer 101 at time T11 is shorter than the reference frame length. In this case, the token bucket 103 is decremented by the value indicating the reference frame length. In addition, tokens that are excessively removed from the token bucket 103 is stored in the cache bucket 301. That is, the cache bucket 301 in incremented by the difference between the reference frame length and the length L3 (ΔL in FIG. 11). Similarly, also at time T12, the cache bucket 301 is incremented.

The length of the output frame read from the frame buffer 101 at time 113 is longer than the reference frame length. In this case, the token bucket 103 is decremented by the value indicating the actual frame length. On the other hand, the value of the cache bucket 301 is maintained. Similarly, at T14, the token bucket 103 is decremented by the value indicating the actual frame length.

At time T15, the value of the token bucket 103 is negative. Assume that the length of the frame stored at the head of the frame buffer 101 at time T15 (that is, the next frame length) is longer than or equal to the reference frame length. Furthermore, the number of tokens stored in the cache bucket 301 is more than or equal to the number of tokens corresponding to the reference frame length. Therefore, in this case, the buffer control unit 303 can read and output the frame stored at the head of the frame buffer 101. At this time, the token control unit 302 decrements the cache bucket 301 by the value indicating the actual frame length (the next frame length in this case). However, the value of the token bucket 103 is unchanged at time T15.

Fourth Embodiment

In the fourth embodiment, a reference frame length is defined for each class, and a transmission data rate and the number of transmission frames per unit time are controlled for each class.

Figure 12:
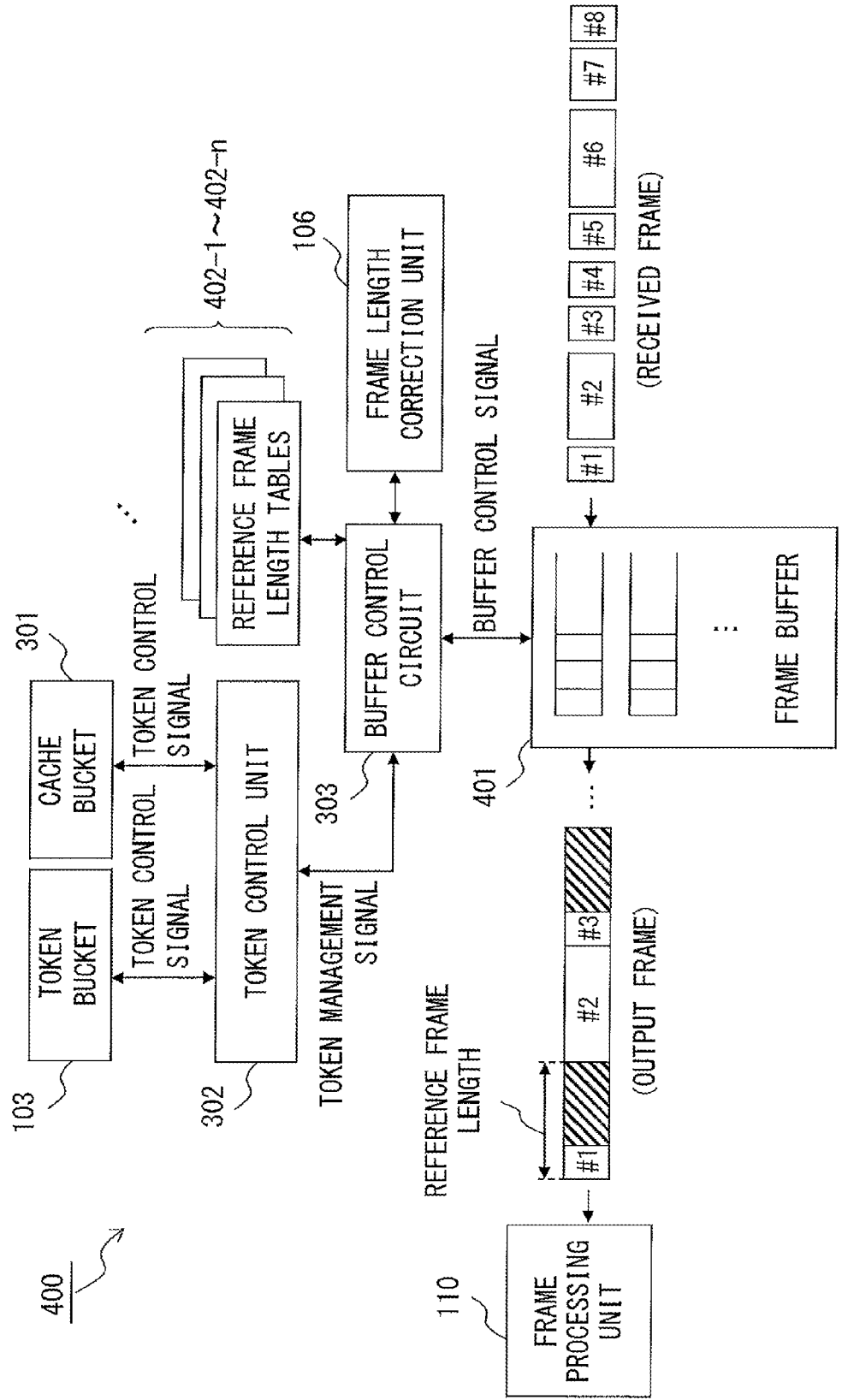
FIG. 12 illustrates a configuration of a bandwidth control device according to a fourth embodiment.

FIG. 12 illustrates a configuration of a bandwidth control device according to a fourth embodiment of the present invention. As illustrated in FIG. 12, a bandwidth control device 400 according to the fourth embodiment includes a frame buffer 401, the token bucket 103, reference frame length tables 402-1 through 402-n, the frame length correction unit 106, the cache bucket 301, the token control unit 302, and the buffer control unit 303. The token bucket 103, the frame length correction unit 106, the cache bucket 301, the token control unit 302, and the buffer control unit 303 are substantially the same in the third and fourth embodiments. The bandwidth control device 400 may include other elements not illustrated in FIG. 12.

The frame buffer 401 stores a received frame for each class. A class may be identified by a priority bit in a VLAN tag. That is, the frame buffer 401 may store a received frame for a priority of each frame. Furthermore, a reference frame length specified for each class is registered in the reference frame length tables 402-1 through 402-n. That is, in the fourth embodiment, a reference frame length is defined for the priority of each user specified by a VLAN tag.

As an embodiment, a reference frame length used for a VLAN user having a high priority is short. Then, an invalid period is not easily added to the frame of the user. Therefore, the number of transmission frames of a VLAN user having a high priority is not easily suppressed. On the other hand, a reference frame length used for a VLAN user having a low priority is long. Then, an invalid period is easily added to the frame of the user. Therefore, the number of transmission frames of a VLAN user having a low priority is easily suppressed. According to this configuration, since the burst of a low priority frame is suppressed, the computer resources (for example, the frame processing unit 110) can process the frame of a high priority user although burst traffic is transmitted from the high priority user.

The number of process steps performed by the frame processing unit 110 depends on a network application or a service application. Therefore, a reference frame length may be defined for each application instead of defining a reference frame length for each class. For example, a long reference frame length is assigned for an application having a large number of process steps performed by the frame processing unit 110. In this case, the load of the frame processing unit 110 is efficiently reduced, and the performance of a transmission device is improved.

Thus, according to the fourth embodiment, the number of transmission frames can be controlled for each group (priority, application, etc.) while controlling the entire transmission data rate. The bandwidth control device illustrated in FIG. 12 is designed based on the configuration illustrated in FIG. 9, but the bandwidth control according to the fourth embodiment may be implemented based on the configuration illustrated in FIG. 4.

Other Embodiments

The bandwidth control device according to the first through fourth embodiments controls the transmission data rate and the number of transmission frames using the token bucket 103. On the other hand, a bandwidth control device 500 illustrated in FIG. 13 controls the transmission data rate using a quantitative token bucket 501 and a quantitative token control unit 502, and controls the number of transmission frames using a numerical token bucket 503 and a numerical token control unit 504. The quantitative token bucket 501 and the quantitative token control unit 502 may operate, for example, as with the token bucket 103 and the token control unit 104. The numerical token bucket 503 is incremented at a specified rate, and decremented by 1 when a frame is read from the frame buffer 101.

Figure 13:
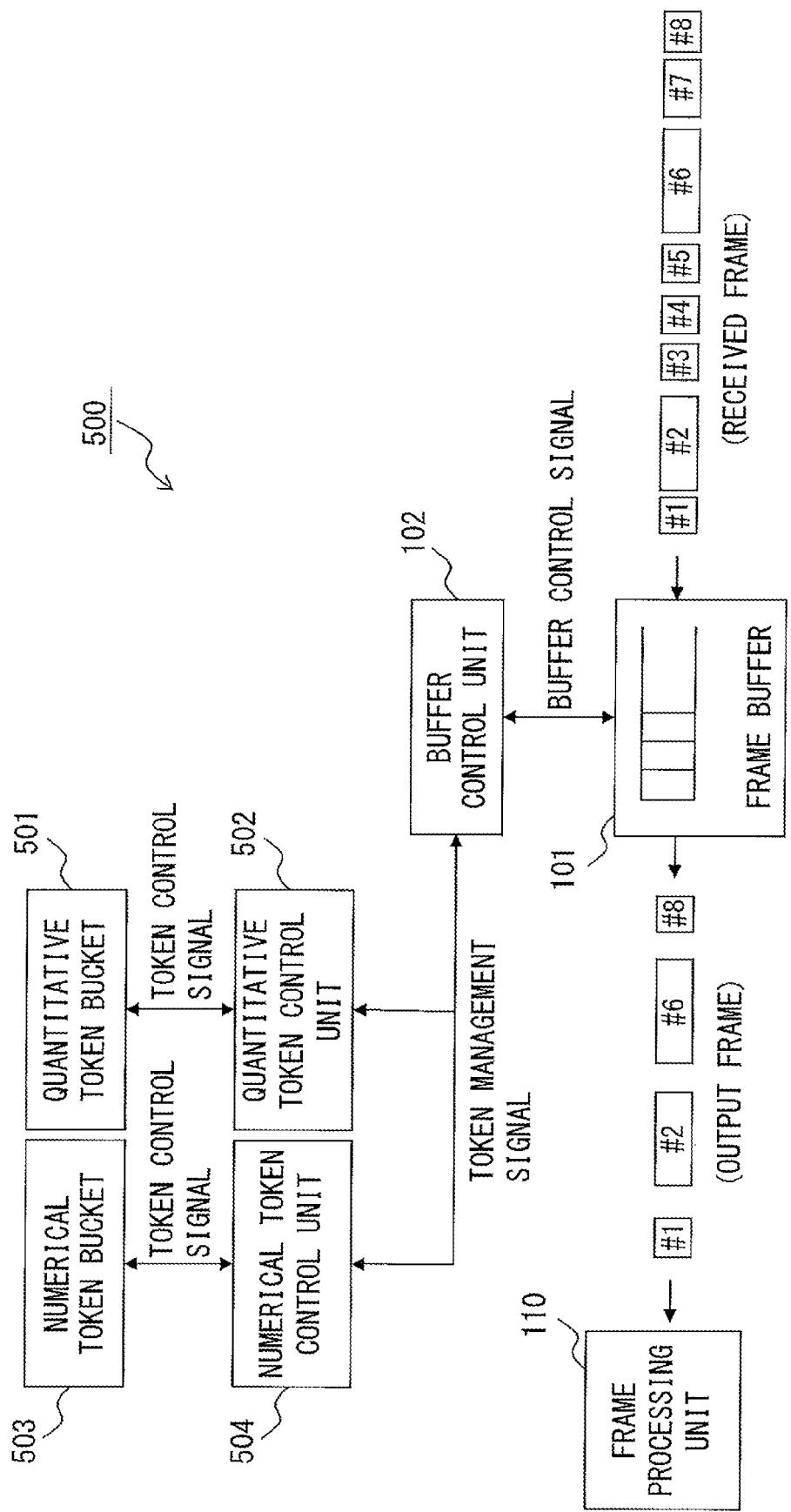
FIG. 13 illustrates a configuration of a bandwidth control device according to another embodiment.

However, in the bandwidth control device 500 illustrated in FIG. 13, it is necessary for each user to provide the quantitative token bucket 501, the quantitative token control unit 502, the numerical token bucket 503, and the numerical token control unit 504. On the other hand, the bandwidth control device 100 illustrated in FIG. 4 may control the number of transmission frames without providing a circuit for controlling the number of transmission frames (the numerical token bucket 503 and the numerical token control unit 504). Therefore, as compared with the configuration illustrated in FIG. 13, according to the configuration illustrated in FIG. 4, the circuit size is reduced, and the cost of the transmission device may also be reduced.

The bandwidth control device 300 illustrated in FIG. 9 includes the cache bucket 301 in addition to the configuration illustrated in FIG. 4. However, the cache bucket 301 is provided to temporarily store a token excessively counted by the token bucket 103. Therefore, as compared with the quantitative token bucket 501 or the numerical token bucket 503 illustrated in FIG. 13, the circuit size of the cache bucket 301 may be reduced. In addition, the process of supplying a token at a specified rate is not performed on the cache bucket 301. Therefore, as compared with the configuration illustrated in FIG. 13, according to the configuration illustrated in FIG. 4, the circuit size is reduced, and the cost of the transmission device may also be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission device, comprising:
   a first counter;
   a counter control unit configured to increment the first counter at a specified rate;
   a frame buffer configured to store a received frame; and
   a buffer control unit configured to read a frame from the frame buffer when a value of the first counter is larger than a specified threshold and output the frame, wherein
   when a length of an output frame read from the frame buffer by the buffer control unit is shorter than a specified reference frame length, the counter control unit decrements the first counter by a value indicating the reference frame length, and
   when the length of the output frame is longer than or equal to the reference frame length, the counter control unit decrements the first counter by a value indicating the length of the output frame.

2. The device according to claim 1, wherein
   when the length of the output frame is shorter than the reference frame length, the buffer control unit provides after the output frame an invalid period in which a process of reading a next frame from the frame buffer is prohibited, the length of the invalid period corresponds to a difference between the length of the output frame and the reference frame length.

3. The device according to claim 1, further comprising
   a frame length correction unit configured to correct the output frame so that the length of the output frame is to be the reference frame length when the length of the output frame is shorter than the reference frame length.

4. The transmission device according to claim 1, further comprising
   a second counter, wherein
   when the length of the output frame is shorter than the reference frame length, the counter control unit increments the second counter by a value indicating a difference between the length of the output frame and the reference frame length, and
   when the first counter is smaller than or equal to the threshold, a length of a next frame stored at a head of the frame buffer is longer than or equal to the reference frame length, and a value of the second counter is larger than or equal to a value indicating the length of the next frame,
   the buffer control unit reads the next frame from the frame buffer and output the next frame, and
   the counter control unit decrements the second counter by the value indicating a length of the next frame.

5. The device according to claim 1, wherein
   the frame buffer is configured to store a received frame for each user, and
   the reference frame length is specified for each user.

6. The device according to claim 1, wherein
   the frame buffer is configured to store a received frame for each priority of a frame, and
   the reference frame length is specified depending on the priority.

7. The device according to claim 6, wherein
   the higher the priority, the longer reference frame length is specified.

8. The device according to claim 1, wherein
   the frame buffer is configured to store a received frame for each application relating to data stored in a frame, and
   the reference frame length is specified for each application.

9. A transmission device, comprising:
   a counter;
   a counter control unit configured to increment the counter at a specified rate;
   a frame buffer configured to store a received frame; and
   a buffer control unit configured to read a frame from the frame buffer when a value of the counter is larger than a specified threshold and output the frame, wherein
   the counter control unit decrements the counter by a value determined based on a length of an output frame read by the buffer control unit from the frame buffer, and
   when the length of the output frame is shorter than a specified reference frame length, the buffer control unit provides after the output frame an invalid period in which a process of reading a next frame from the frame buffer is prohibited, the length of the invalid period corresponds to a difference between the length of the output frame and the reference frame length.

10. A transmission method for controlling a transmission of a frame in a transmission device that includes a frame buffer to store a received frame, the transmission method comprising:
    incrementing a counter at a specified rate;
    reading a frame from the frame buffer when a value of the counter is larger than a specified threshold;
    decrementing the counter by a value indicating a specified reference frame length when a length of an output frame read from the frame buffer is shorter than the specified reference frame length; and
    decrementing the counter by a value indicating the length of the output frame when the length of the output frame longer than or equal to the reference frame length.

* * * * *